A. HARGRAVES.
EXPANSIBLE CORE FOR VULCANIZING TIRES.
APPLICATION FILED AUG. 8, 1917. RENEWED AUG. 15, 1919.
1,319,770.
Patented Oct. 28, 1919.
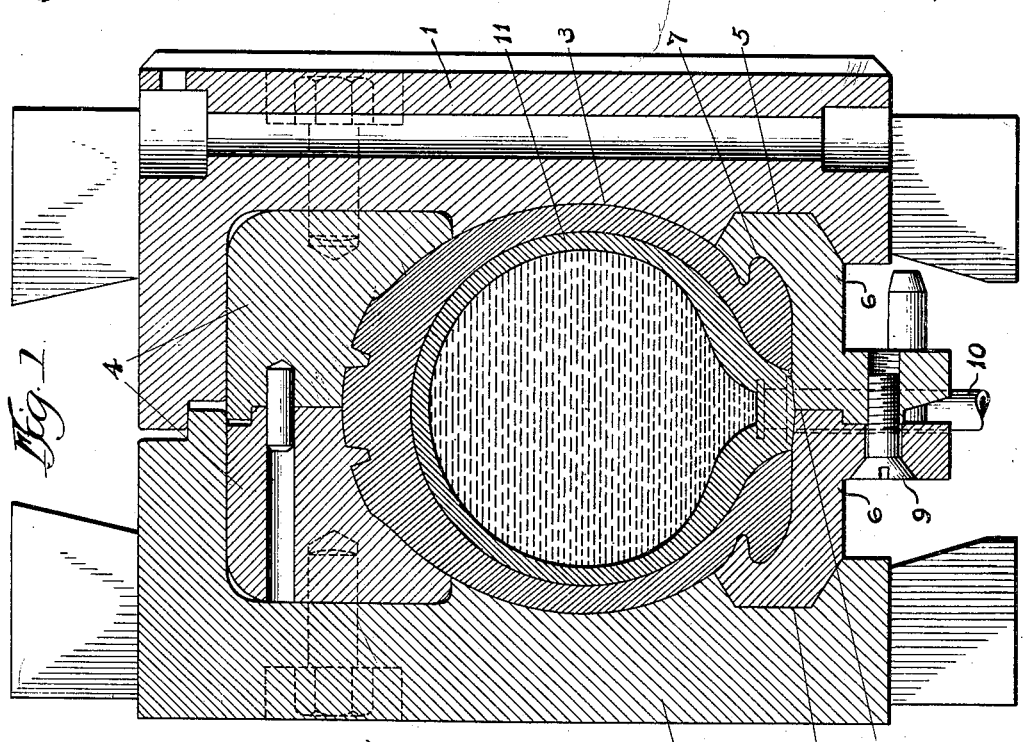
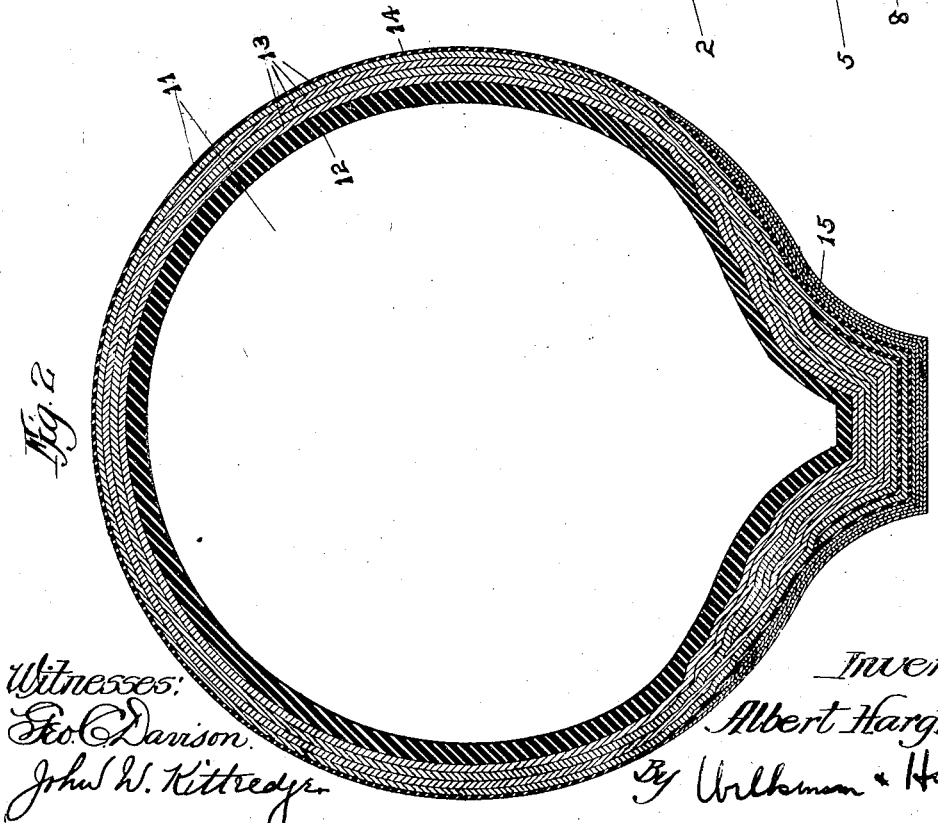

UNITED STATES PATENT OFFICE.

ALBERT HARGRAVES, OF AKRON, OHIO.

EXPANSIBLE CORE FOR VULCANIZING TIRES.

1,319,770.　　　　Specification of Letters Patent.　　Patented Oct. 28, 1919.

Application filed August 8, 1917, Serial No. 185,208. Renewed August 15, 1919. Serial No. 317,812.

*To all whom it may concern:*

Be it known that I, ALBERT HARGRAVES, a subject of the King of Great Britain, and residing at Akron, in the county of Summit, State of Ohio, have invented certain new and useful Improvements in Expansible Cores for Vulcanizing Tires, of which the following is a specification.

In the art of vulcanizing rubber tires it has long been a practice to vulcanize tires while they are expanded by means of internal pressure, with water, air, or steam. For this purpose the pressure medium has either been introduced directly into the tire casing, or into an expansible core placed inside the casing. It is with improvements in the construction of these expansible bags that this invention has to do, and by use of this improved expansible bag superior results are obtainable.

In using an expanding core it is necessary to furnish compression in the lower edges of the casing or beads by some means other than the air bag and for this purpose use has been made of continuous iron rings which have been placed in the interior of the casing and extended part way up the side of the tire by means of which a firm abutment is furnished against which the beads will be held and firmly compressed. Instead of relying on the pressure of the mold to attain the compression desired around the beads, I propose to use a pair of separable rings, one for each bead which are provided with means to draw them together to compress the beads. Instead of using the iron ring or, "bull ring," as it is termed, inside the lower edges of the tire, it is the purpose of my invention to use, in combination either with a mold or with a mold and the compression rings a bag made of fabric and rubber exclusively which is made stiff enough on its inner periphery to afford an adequate abutment against which the beads may be compressed. By constructing the entire bag of rubber and fabric the tires when cured present a smooth inner circumference, which is not present when a "bull ring" is used as the ring always leaves a sharp line around the inside of the casing where the upper edge came. It is not only objectionable to have such a line present but the sudden transition from the hard ring to the softer extensible bag causes a sudden change in the character of the casing which is undesirable.

By use of my improved inflatable bag there is provided a firm abutment between the beads of the tire, which gradually diminishes in stiffness upwardly of the side of the bag leaving a perfectly formed casing without any sudden line of demarcation due to the change from the stiff to the flexible portion of the bag.

In the drawings accompanying this specification is shown one form of the invention in which the bag is shown used in combination with the compression rings, but it is understood that the invention is not limited to use with these rings but the bag may be used with solid mold pieces extending entirely over the side of the casing. It is also understood that the shape of the bead is immaterial and this invention may be used in the manufacture of all types of tires.

In the drawings:

Figure 1 is a cross sectional view through a tire mold showing my improved air bag in position for the curing of the tire.

Fig. 2 is an enlarged cross section of the bag showing the method of construction.

The tire mold may be of any well known or approved construction and consists of the two parts 1 and 2 hollowed out to afford the mold cavity 3. In the upper part of the cavity of each mold is secured a suitable tread forming ring 4. The lower or inner portion of each part of the mold is either formed to the shape of the tire as in the ordinary practice (not shown) or is provided with a recess 5 in which may be received the compression rings 6 previously referred to.

Two compression rings are provided one for each bead of the tire, the outer edges being finished to conform to the lower edge of the casing. In the form shown the compression rings are shaped to form a tire of the clencher type, but this may be changed to a "straight side" tire forming ring if desired. The two rings are nicely fitted by mortise 8. A number of screws 9 are passed through one of the compression rings and threaded into the other. The rings are apertured at suitable points to receive the bag inflating stem 10, as will be understood.

When using the compression rings the inflatable bag, numbered here as 11, is first placed in the tire casing and partially inflated to make it fill out the tire, and the compression rings are then placed about the beads. Clamps or presses are now used to force the rings together until screws 9 can be dropped into place by which the rings can be finally drawn home. The tire, with the bag in place and the rings secured about the beads, is now placed in the mold and the bag expanded and the tire cured as in the regular practice. Where compression rings are not used the pressure of the hydraulic rams, or of securing bolts is relied upon to give the proper compression to the beads.

It will be noted from a casual inspection of the drawings that my invention comprises, in combination with the molding means for the outside of the tire, an inflatable core member which is thickened and stiffened at its inner circumference but the walls are gradually tapered off until at a point slightly above the bead line, it gradually merges into the thinner expansible wall which forms the major portion of the bag.

Referring now particularly to Fig. 2, the construction of the bag 11 is shown in detail. In building up the bag there is first formed a heavy inner layer or lining of rubber 12. Over this inner layer are then placed a plurality of layers of rubberized fabric, according to the size of the bag. In the drawing I have shown four of these layers of fabric which may be ordinary canvas such as used in making fabric tires or cord fabric, such as used in making cord tires. These layers are indicated in the drawing by numeral 13, and it will be seen that each layer 13 is overlapped at the base or inner edge of the air bag. The innermost layer is preferably overlapped the greatest distance, and each successive layer slightly less in order to afford a gradual thickening of the inside of the bag. This gradual tapering is not absolutely essential to my invention but is preferred as it gives superior results. An outer layer of gum 14 may now be placed around the bag. Around the inner circumference of the bag there are placed one or more layers of rubberized fabric, indicated at 15 which serve to further strengthen the bead forming portion of the bag. These layers of fabric are preferably made of decreasing widths toward the inside of the bag to afford a better tapering-off upwardly of the bag. After being made up in the manner indicated the bag is cured in a mold which gives it a permanent shape corresponding to the inside of a tire casing fluid pressure being used inside the bag while it is cured.

When the air bag is placed in the tire and the molding member for the outside of the tire placed around it, pressure to any suitable degree and preferably hydraulic pressure is admitted to the bag and the outer portion of the tire is cured while expanded while the beads are firmly compacted into place.

It is obvious that in addition to the changes in the mold as outlined above changes may be made in the construction of the bag. It is entirely within the scope of this invention to omit the upper, more expansible portion of the bag entirely and simply use the lower portion as a "bull ring" in systems in which no inflatable bag is used but the fluid pressure is applied directly to the inside of the casing.

The gist of this invention consists in the provision of a firm but semi-flexible ring between the beads of the tire on which sufficient pressure may be obtained to properly form the beads between the mold members. While I have shown the result obtained by a plurality of plies of fabric and rubber, it is obvious that other materials may be substituted to accomplish the same results.

Other changes and modifications may be made without departing from the spirit of the invention and within the scope of the appended claims.

I claim:

1. In an apparatus for vulcanizing tire casings, an expansible bag comprising layers of fabric and rubber, the inner edge of said bag being molded to fit between the beads of a tire casing, and composed of a number of layers of fabric, greater in number than the number of plies forming the body portion of said bag, the number of layers of fabric decreasing gradually from the inner edge of the bag to a point above the bead line.

2. In an apparatus for vulcanizing tire casings, an expansible bag comprising layers of fabric and rubber, the inner edge of said bag being molded to fit between the beads of a tire casing, and composed of a number of layers of fabric, greater in number than the number of plies forming the body portion of said bag, the number of layers of fabric decreasing gradually from the inner edge of the bag to a point above the bead line in combination with a pair of bead forming rings and means to hold the rings together.

3. In an apparatus for vulcanizing tire casings, an expansible bag comprising layers of fabric and rubber, the said layers being overlapped at the inner edges, additional layers of fabric over the inner edge of said bag, the inner edge of said bag being vulcanized to fit between the edges of the tire casing, the arrangement of said layers of fabric being such that the number decreases gradually toward the main body of the bag.

4. In an apparatus for vulcanizing tire casings, an expansible bag comprising layers of fabric and rubber, the said layers being overlapped at the inner edges, additional layers of fabric over the inner edge of said bag, the inner edge of said bag being vulcanized to fit between the edges of the tire casing, the arrangement of said layers of fabric being such that the number decreases gradually toward the main body of the bag in combination with a pair of bead forming rings and means to hold the rings together.

ALBERT HARGRAVES.